C. R. UNDERHILL.
ELECTRICAL COIL AND METHOD OF MAKING THE SAME.
APPLICATION FILED JAN. 19, 1912.

1,036,935.

Patented Aug. 27, 1912.

Witnesses
M. P. Nichols
C. L. Weed

Inventor
Charles R Underhill
by Seymour Earle
Atty

UNITED STATES PATENT OFFICE.

CHARLES R. UNDERHILL, OF NEW HAVEN, CONNECTICUT, ASSIGNOR TO THE ACME WIRE CO., OF NEW HAVEN, CONNECTICUT, A CORPORATION.

ELECTRICAL COIL AND METHOD OF MAKING THE SAME.

1,036,935.     Specification of Letters Patent.     Patented Aug. 27, 1912.

Application filed January 19, 1912. Serial No. 672,135.

*To all whom it may concern:*

Be it known that I, CHARLES R. UNDERHILL, a citizen of the United States, residing at New Haven, in the county of New Haven and State of Connecticut, have invented a new and useful Improvement in Electrical Coils and Methods of Making the Same; and I do hereby declare the following, when taken in connection with the accompanying drawings and the characters of reference marked thereon, to be a full, clear, and exact description of the same, and which said drawings constitute part of this application, and represent, in—

Figure 1:
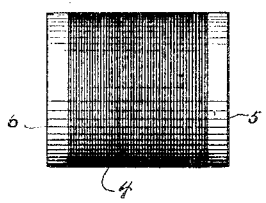
Figure 2:
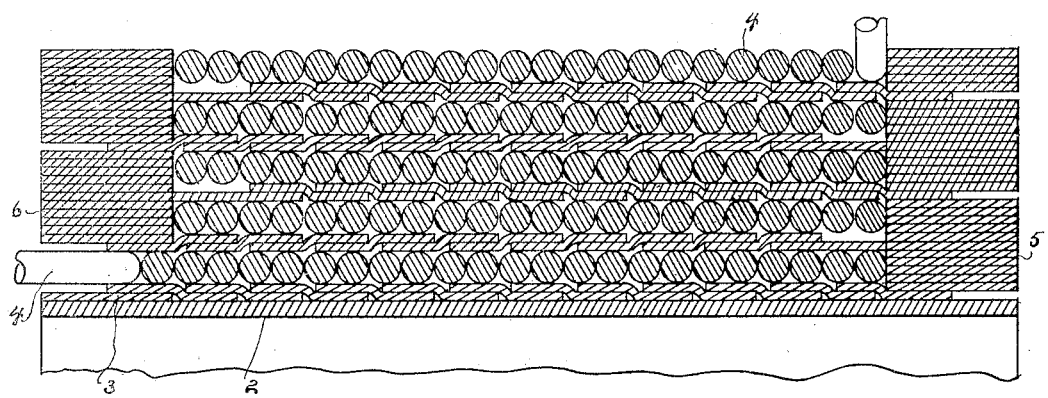
Figure 3:
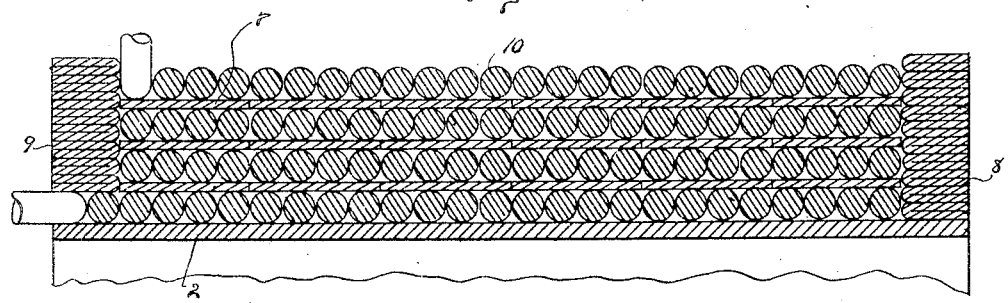

Figure 1 a view in elevation of one form which an electrical coil constructed in accordance with my invention may assume. Fig. 2 a broken view on an enlarged scale in central longitudinal section showing one way in which a coil constructed in accordance with my invention may be built up, this view being schematical for the reason that it is not practical to accurately show the thickness of the tapes as compared with their width. Fig. 3 a broken, sectional view showing the doubling of the tapes in the building up of solid laminated closures at the ends of the coils.

My invention relates to an improvement in that class of electrical coils which consist of alternate layers of wire and paper or other insulating material, the object being to produce, at a low cost for manufacture, an electrical coil of superior mechanical and electrical durability, in which the layers of wire and insulating material, are more compactly organized than in the electrical coils of the prior art, and in which the insulating material may be solidly built up at the ends of the coil so as to give finish and structural solidity thereto, as well as to protect the end turns of the wire.

With these ends in view, my invention consists in an electrical coil having certain details of construction and combinations of parts and method of production as will be hereinafter described and pointed out in the claims.

As herein shown, my improved electrical coil consists of a hollow paper core 2, whether of tubular, rectangular or other cross-section, on which is built up, either manually or by the use of automatic or semi-automatic machinery, alternating layers of wire and thin, narrow tapes of paper, silk or other insulating material. The wire itself may be provided with an insulating coating of enamel, silk, cotton or other suitable material, or its adjacent turns may be spaced so as to be insulated from each other by the air or by some compound applied either during winding or after the coil is finished. Ordinarily the wire will be enameled in accordance with the prevailing practice which is too well understood to need description. Instead of employing a sheet of paper corresponding in width to the length of the finished coil, in case the coils are made singly, or corresponding in width to the length of a plurality of coils, in case the coils are produced simultaneously in multiple, I employ, as already indicated, thin, narrow strips of paper, silk or other equivalent material. To distinguish these strips from the sheets of paper heretofore used for the layer-insulation in making these coils, I shall designate them as tapes not only as indicative of their relatively narrow width, but also as suggestive of the fact that they are applied in spiral turns, and so incorporated with the wire turns in multiple, whereas paper sheets rest, in being applied, upon the full width of a layer of wire and cannot for that reason become so incorporated with the turns of wire as can spirally wound thin tapes of paper.

From the foregoing it will appear that my improved coil is distinguished from the coils of the prior art in that the layer-insulation is introduced in the form of spirally wound tapes preferably not wider than from an eighth to three-sixteenths of an inch when paper one-thousandth of an inch in thickness is used. I do not limit myself to tapes of any special width or thickness, but they must be narrow enough to be applied spirally, whether their edges are overlapped or not. The employment of such tapes enables me to build up, if desired, at the respective ends of each coil, solid laminated end-closures consisting of the tapes wound turn upon turn. Ordinarily the tapes will be applied so that there will be more layers of tapes in the said end-closures than between the layers of wire, for the purpose of giving particular solidity, durability and finish to the ends of the completed coils as distinguished from ordinary coils made with sheets of paper in which the edges of the paper project beyond the outer turns of wire and are to an extent held apart from each other thereby so as to make coil-ends without structural solidity even when reinforced with stiffening compositions of one sort or another.

In producing the particular coil chosen for the illustration of my invention, I start winding a thin, narrow tape 3 and a wire 4 upon the left hand of the paper core 2. The tape is started winding in advance of the wire and is wound spirally so as to overlap about half of its width, while the wire is wound so that its turns will be in actual lateral contact, or approximately in lateral contact. The tape, though narrow, being relatively wide, as compared with the diameter of the wire, the layer of paper will "make" faster than the layer of wire, and therefore reach the right hand end of the core 2 some time before the wire reaches the limit of its right hand traverse. The wire and tapes are wound at different pitches. After the tape reaches the limit of its right hand traverse, its pitch of winding is reduced to zero, so that it begins to wind, turn upon turn, and therefore to build up the solid, laminated right hand end-closure 5 of the coil in a series of vertical, or as may be said, concentric laminations or layers. The number of layers of tape built up in this way at this time will vary with the thickness of the tape itself, and the diameter of the wire, but in any event, sufficient layers of tape will be applied at this time to raise the height of the right hand end-closure 5 of the coil to the level of the top of the second layer of wire not yet wound on. The tape is now severed and the feeding of paper into the coil momentarily interrupted, the free end of tape in the closure being fastened thereto by a modicum of some adhesive or in some suitable fashion. When the wire reaches the limit of its right hand traverse, and thus completes the first layer of wire, the traverse of the wire is reversed, and the second layer of wire is begun, being wound from right to left. Just before the second layer of wire is begun, the tape is fed in beneath the wire now being reversed and over the turns of wire forming the right hand end of the first layer of wire and at a lower level than the periphery of the rudimentary right hand end-closure. The tape now travels in spirals from right to left faster than the wire travels in the same direction and soon reaches the left hand end of the coil where its winding pitch, so to speak, is reduced to zero so as to wind, turn upon turn, and thus begin the formation of a solid laminated end-closure 6 for the left hand of the coil. The number of turns of tape applied at this time to the closure 6 will depend upon the thickness of the tape and the diameter of the wire. This will continue until the periphery of the rudimentary left hand end-closure reaches the level of the top of the third layer of wire which has not yet been wound on. The tape is now severed and fastened, and no more is fed until the second layer of wire has been completed. Then just as the traverse of the wire is reversed and it begins to travel from left to right for winding on the third layer of wire, the tape is inserted over the turns of wire forming the left hand end of the second layer, beneath the wire just beginning the left hand end of the third layer of wire and below the level of the periphery of the rudimentary left hand closure 6. The tape is now wound on spirally from left to right in advance of the wire, and the above alternations in the winding of paper and wire are continued until the coil is built up to the required size, or until it contains the required number of turns of wire and tapes. Instead of severing the tape as suggested, the winding of wire and tape may be so timed that the last layer of paper will not be wound upon either closure until just as the wire is starting to reverse, in which case the tape will not be severed but will be dropped in level and caught under the wire as the same is reversing. But this is a detail of manufacture, and the product is substantially the same whether the paper is from time to time severed and fastened or fed continuously.

When the coil is finished, if constructed as shown and described, it will consist of layers of wire solidly embedded between layers of paper composed of spirally wound thin paper tape, the end turns of the layers of wire and the end turns of the layers of tape being interposed between solid laminated end-closures built up of layers of the same tape wound turn upon turn, there being a greater number of layers of tape in the closures, in the aggregate, than there are layers of tape, in the aggregate, between the layers of wire.

As shown in Fig. 2, the tapes entering into the formation of the end-closures are continuations of the tapes forming the layers of paper between the layers of wire, but this is not essential and the end-closures might be wound on as shown in Fig. 3, before or after the application of the alternate layers of wire and paper insulation.

What I particularly wish to emphasize is, that the paper being introduced in the form of spirally wound tapes, conforms itself to groups, as it were, of turns of wire, with the result of producing a more solid and more compactly organized structure than can be produced by winding on sheets of paper the turns of which, being of the full width of the layers of wire, are supported from end to end thereby. A sheet of paper so applied and so supported is relatively inflexible as compared with a thin tape and cannot become incorporated as can tape into the structure of the coil. Moreover tension applied to a sheet of paper being wound on an axis at a right angle to its axis, is far less effective than tension applied to a tape being wound spirally, at an acute angle to its axis.

In finishing the coil, the laminated end-closures are preferably treated with a suitable compound, such as "bakelite," whereby they are given the solidity of wood or molded fiber heads. Ordinarily the surface of the entire coil will be treated to the same mixture at the same time. The end-closures, when so treated, not only give the completed coil a finished and workmanlike appearance, but greatly increase its electrical and mechanical durability. In other words, the laminated flange-like closures built up at the ends of the coil, give the coil the character and stability that it would have if the windings of wire and paper were applied to a bobbin of fiber or wood having integral flanges at its ends, since the layers of tape in the closures are continuations of the layers of tape between the layers of wire, whereby the end-closures and layers of paper are all tied together, so to speak. Furthermore, the end turns of wire in the respective layers of wire are interlocked with the end turns of tape in the layers of paper and with certain turns of tape in the closures, so that the tension on the wire holds the paper, while the tension on the paper holds the wire, thereby binding the layers of wire, the layers of paper and the end-closures all together. I wish to point out, also, that in my improved coil, the layers of wire are located in separate horizontal compartments completely closed at their ends by solid closures. This is of great practical advantage as it reinforces the insulation at the ends of the layers of wire where the electrical stress is the greatest.

I would have it understood that I do not limit myself to making the coils as shown and described, as they may be varied in detail according to the character of use. However, the coil shown and described will be sufficient for the illustration of my invention of an electrical coil composed of alternate layers of wire and insulating material, the latter applied in the form of spirally wound tapes, whether or not the coil is also furnished with laminated end-closures tied into the layers of wire and paper, or made separately therefrom or dispensed with altogether.

In the modified construction shown by Fig. 3 of the drawings, the tapes 7 are not overlapped but spirally wound edge to edge so as to form layer-insulation of uniform thickness between the layers of wire 10. The tapes 7 are not in this modified construction continued to form end-closures as in the construction shown by Fig. 2, but the end-closures 8 and 9 are wound upon the core 2 either before or after the application of the wire and layer-insulation thereto. As shown, the end-closures 8 and 9 are built up by winding tapes, turn upon turn, so as to form solid laminated end-closures; but in order that these closures may be built up faster, and in order that the length of the coil may be reduced, the tapes are doubled preparatory to being wound on to form the closures. However, the winding of the tapes edge to edge as in Fig. 3, may be practised whether or not the tapes are wound flat as shown in Fig. 2 for the production of the end-closures 5 and 6, or doubled as shown in Fig. 3 for the production of the end-closures 8 and 9.

I claim:—

1. An electrical coil composed of alternating layers of wire, and layers of spirally wound tape of insulating material, the wire and tape being wound at different pitches.

2. An electrical coil composed of alternating layers of wire and layers of spirally wound, thin, narrow tape of insulating material, the wire and tape being wound at different pitches.

3. An electrical coil composed of alternating layers of wire, and layers of spirally wound tape of insulating material, the edges of the tape being overlapped and the wire and tape wound at different pitches.

4. An electrical coil composed of alternating layers of wire, and layers of spirally wound tape of insulating material, the wire and tape being wound at different pitches, and having end-closures composed of tape wound turn upon turn.

5. An electrical coil composed of alternating layers of wire and layers of spirally wound tape of insulating material, and having end-closures formed by continuations of the tape wound turn upon turn.

6. An electrical coil composed of alternating layers of wire, and layers of spirally wound tape of insulating material, and having laminated closures built up of extensions of the tape, the turns of wire at the ends of the layers of wire and the turns of tape at the ends of the layers of insulating material and the laminated closures being interlocked.

7. A method of producing an electrical coil consisting in building it up from alternate layers of wire and spirally wound thin, narrow tapes of insulating material, the wire and tapes being wound at different pitches.

8. A method of making an electrical coil, consisting in winding, one upon the other, alternate layers of wire and thin narrow tapes of insulating material, the wire and tapes being wound at different pitches, and in winding the tapes concentrically at the ends of the said layers to form solid end-closures.

In testimony whereof, I have signed this specification in the presence of two subscribing witnesses.

CHARLES R. UNDERHILL.

Witnesses:
  GEORGE D. SEYMOUR,
  CLARA L. WEED.

Copies of this patent may be obtained for five cents each, by addressing the "Commissioner of Patents, Washington, D. C."